United States Patent
Zhang et al.

(10) Patent No.: US 11,961,266 B2
(45) Date of Patent: Apr. 16, 2024

(54) MULTIVIEW NEURAL HUMAN PREDICTION USING IMPLICIT DIFFERENTIABLE RENDERER FOR FACIAL EXPRESSION, BODY POSE SHAPE AND CLOTHES PERFORMANCE CAPTURE

(71) Applicants: SONY GROUP CORPORATION, Tokyo (JP); Sony Corporation of America, New York, NY (US)

(72) Inventors: Qing Zhang, San Jose, CA (US); Hanyuan Xiao, Los Angeles, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 142 days.

(21) Appl. No.: 17/701,991

(22) Filed: Mar. 23, 2022

(65) Prior Publication Data

US 2022/0319055 A1 Oct. 6, 2022

Related U.S. Application Data

(60) Provisional application No. 63/279,916, filed on Nov. 16, 2021, provisional application No. 63/168,467, filed on Mar. 31, 2021.

(51) Int. Cl.
*G06T 9/00* (2006.01)
*G06T 7/246* (2017.01)
(Continued)

(52) U.S. Cl.
CPC ............ *G06T 9/002* (2013.01); *G06T 7/251* (2017.01); *G06T 13/40* (2013.01); *G06T 13/80* (2013.01);
(Continued)

(58) Field of Classification Search
CPC ......... G06T 9/002; G06T 7/251; G06T 13/40; G06T 13/80; G06T 17/00; G06T 15/20;
(Continued)

(56) References Cited

U.S. PATENT DOCUMENTS

2020/0066029 A1  2/2020  Chen et al.

FOREIGN PATENT DOCUMENTS

| CN | 111062777 A | * | 4/2020 | ......... G06Q 30/0643 |
| CN | 112232914 A | * | 1/2021 | ......... G06Q 30/0643 |

(Continued)

OTHER PUBLICATIONS

Bharat Lal Bhatnagar et al., "Multi-Garment Net: Learning to Dress 3D People from Images", https://arxiv.org/pdf/1908.06903.pdf, 11 pages, Oct. 2003.

(Continued)

*Primary Examiner* — Jeffery A Brier
(74) *Attorney, Agent, or Firm* — Haverstock & Owens, A Law Corporation

(57) ABSTRACT

A neural human performance capture framework (MVS-PERF) captures the skeleton, body shape and clothes displacement, and appearance of a person from a set of calibrated multiview images. It addresses the ambiguity of predicting the absolute position in monocular human mesh recovery, and bridges the volumetric representation from NeRF to animation-friendly performance capture. MVS-PERF includes three modules to extract feature maps from multiview images and fuse them to a feature volume, regress the feature volume to a naked human parameters vector, generating an SMPL-X skin-tight body mesh with a skeletal pose, body shape, and expression, and leverage a neural radiance field and a deformation field to infer the clothes as the displacement on the naked body using differentiable rendering. Clothed body mesh is obtained by adding the (Continued)

interpolated displacement vectors to the SMPL-X skin-tight body mesh vertices. The obtained radiance field is used for free-view volumetric rendering of the input subject.

26 Claims, 5 Drawing Sheets

(51) Int. Cl.
    *G06T 13/40*     (2011.01)
    *G06T 13/80*     (2011.01)
    *G06V 40/16*     (2022.01)
    *H04N 13/111*     (2018.01)
    *H04N 13/282*     (2018.01)

(52) U.S. Cl.
    CPC ......... *G06V 40/168* (2022.01); *H04N 13/111* (2018.05); *H04N 13/282* (2018.05)

(58) Field of Classification Search
    CPC .... G06V 40/168; G06V 10/82; G06V 20/647; G06V 40/103; G06V 40/175; H04N 13/111; H04N 13/282
    See application file for complete search history.

(56) References Cited

FOREIGN PATENT DOCUMENTS

CN     112258269 A  *  1/2021
WO     2020/112729 A1   6/2020

OTHER PUBLICATIONS

International Search Report dated Jun. 28, 2022, International Application No. PCT/IB2022/053034, 13 pages.

"Pixel-aligned Volumetric Avatars", Amit Raj et al., Jan. 7, 2021, 10 pages.

"Neural Body: Implicit Neural Representations with Structured Latent Codes for Novel View Synthesis of Dynamic Humans", Sida Peng et al., Mar. 29, 2021, 10 pages.

"Learning to Implicitly Represent 3D Human Body From Multi-scale Features and Multi-view Images", Jan. 10, 2021, pp. 8968-8975.

"A-Nerf: Surface-free Human 3D Pose Refinement via Neural Rendering", Shih-Yang Su et al., Feb. 11, 2021, 15 pages.

* cited by examiner

MULTIVIEW NEURAL HUMAN PREDICTION USING IMPLICIT DIFFERENTIABLE RENDERER FOR FACIAL EXPRESSION, BODY POSE SHAPE AND CLOTHES PERFORMANCE CAPTURE

CROSS-REFERENCE TO RELATED APPLICATION(S)

This application claims priority under 35 U.S.C. § 119(e) of the U.S. Provisional Patent Application Ser. No. 63/279,916, filed Nov. 16, 2021 and titled, "MULTIVIEW NEURAL HUMAN PREDICTION USING IMPLICIT DIFFERENTIABLE RENDERER FOR FACIAL EXPRESSION, BODY POSE SHAPE AND CLOTHES PERFORMANCE CAPTURE," and U.S. Provisional Patent Application Ser. No. 63/168,467, filed Mar. 31, 2021 and titled, "MULTIVIEW NEURAL HUMAN PREDICTION USING IMPLICIT DIFFERENTIABLE RENDERER FOR FACIAL EXPRESSION, BODY POSE SHAPE AND CLOTHES DISPLACEMENT," which are both hereby incorporated by reference in their entirety for all purposes.

FIELD OF THE INVENTION

The present invention relates to three dimensional computer vision and graphics for the entertainment industry. More specifically, the present invention relates to acquiring and processing three dimensional computer vision and graphics for film, TV, music and game content creation.

BACKGROUND OF THE INVENTION

Previous systems, e.g., Facebook FrankMocap, predict only the naked body shape and pose from a single image. Such systems cannot predict clothes surface. Such systems are a 2D image translation approach and cannot handle multiview input.

Implicit Part Network predicts both body and clothes from a scanned or reconstructed point cloud but requires 3D scans and cannot handle RGB images as input, nor facial expression and appearance. Also, Implicit Part Network only predicts a label to identify a voxel as body or clothes, and then fits the human prior model explicitly, which is slow. Neural Body and Animatable NeRF predict clothes human body without facial expression using neural radiance field (NeRF). But they require to create a dense latent code volume, which is limited to a low resolution and results in a coarse human geometry. And they can only recover volumetric human model without mesh vertex correspondences.

SUMMARY OF THE INVENTION

Multiview neural human prediction includes predicting a 3D human model including skeleton, body shape and clothes displacement and appearance from a set of multiview images given camera calibration.

In one aspect, a neural network takes an input set of images, which is able to be a single image or multiple images, from different views, and predicts a layered 3D human model. The set of images comprises a 4D tensor of size N×w×h×c, where N is a number of views, w is width of an image, h is height of the image, and c is a channel of the image. Camera information for the set of images is known. The output model contains three layers from inner to outer: a skeleton at a predicted pose; a naked 3D body of a predicted shape with facial expression (e.g., SMPL-X model parameterized by blendshapes and joint rotations); and a 3D field of clothes displacement and the appearance RGB color inferred from the input images. A clothed body mesh is obtained by deforming the naked 3D body mesh according to the clothes displacement field.

In another aspect, the neural network is comprised of three sub-networks: a multiview stereo 3D convolutional neural network (MVS-3DCNN), which encodes the input image set to features, a human mesh recovery multilayer perceptron (HMR MLP), which regresses the features to human parameters, and a neural radiance field multilayer perceptron (NeRF MLP), which fine-tunes the MVS-3DCNN and decodes a query 3D ray (3D location and direction) to an RGB color and a clothes-to-body displacement.

In another aspect, in a test/inference mode, within the view range of cameras in the training data, prediction of the layered 3D human model is device agnostic, fully automatic and real time for a small input set without any explicit numerical optimization. When predicting with the trained neural network, MVS-3DCNN takes the multiview image set as input, chooses the frontal view as the reference view and extracts a feature volume. HMR MLP regresses all the feature volumes to the human pose, shape, facial expression parameters. SMPL-X model generates the human naked body mesh according to the parameters. And then the naked body mesh is converted into an occupancy field in its bounding box. For any 3D point near the body mesh, associated with ray directions from each center of view, the trained NeRF MLP generates an RGB color and a 3D displacement vector pointing to the surface of the naked body. By querying all rays shooting from all pixels of a camera view (either same as input view or any novel view), the appearance of the clothed human body is able to be rendered as an RGB image. By deforming the naked body using the 3D displacement vectors from sampled points, it is able to obtain the clothed body mesh, e.g., SMPL-X+D, of the same vertex correspondence to the SMPL-X model.

In another aspect, training the neural network includes two cases: supervision and self-supervision. In a supervision case, a labeled dataset with known human parameters is given, e.g., H36M dataset. The ground truth (GT) parameters and shapes are compared with the CNN-regressed parameters and shapes. The difference is computed as a shape loss. Meanwhile, rays are cast from sampled pixel in the input image set, and NeRF MLP renders the rays and regresses parameters to colors and densities, which is a function of the density of the naked body and the 3D clothes displacement. A color loss is computed by the sum of differences of sampled pixel colors and rendered colors. On the other hand, in most existing datasets where GT human parameters are unknown, e.g., motion capture dataset, self-supervision/self-improving training is utilized. In each training iteration, after parameters are regressed from MVS 3DCNN, they are sent to an optimization-based human prediction algorithm, such as SMPLifyX and optimized by explicit numerical optimization approaches. The optimized parameters are compared with the CNN-regressed parameters and becomes the shape loss. The remaining steps are the same as the supervised training, but self-improving training takes more epochs and longer time than the supervised case. Training of the whole neural network is performed by parallel optimization algorithms such as Adam, which minimizes both shape and color losses, and outputs optimized network weights.

DETAILED DESCRIPTION OF THE PREFERRED EMBODIMENT

Neural human prediction includes predicting a 3D human model including a pose of a skeleton, body shape and clothes displacement and appearance from a set of images (a single image or multiview images). Embodiments of the neural human prediction describe methods for using a neural network. Multiview neural human prediction outperforms the single image-based mocap and human lifting in quality and robustness, simplifies the architecture of the body clothes prediction network such as Implicit Part Network, which takes a sparse point cloud as input with heavy memory cost and performs slowly, and avoids the resolution limitation of latent-code-based network, such as Neural Body, which encodes the entire 3D volume.

Figure 1:
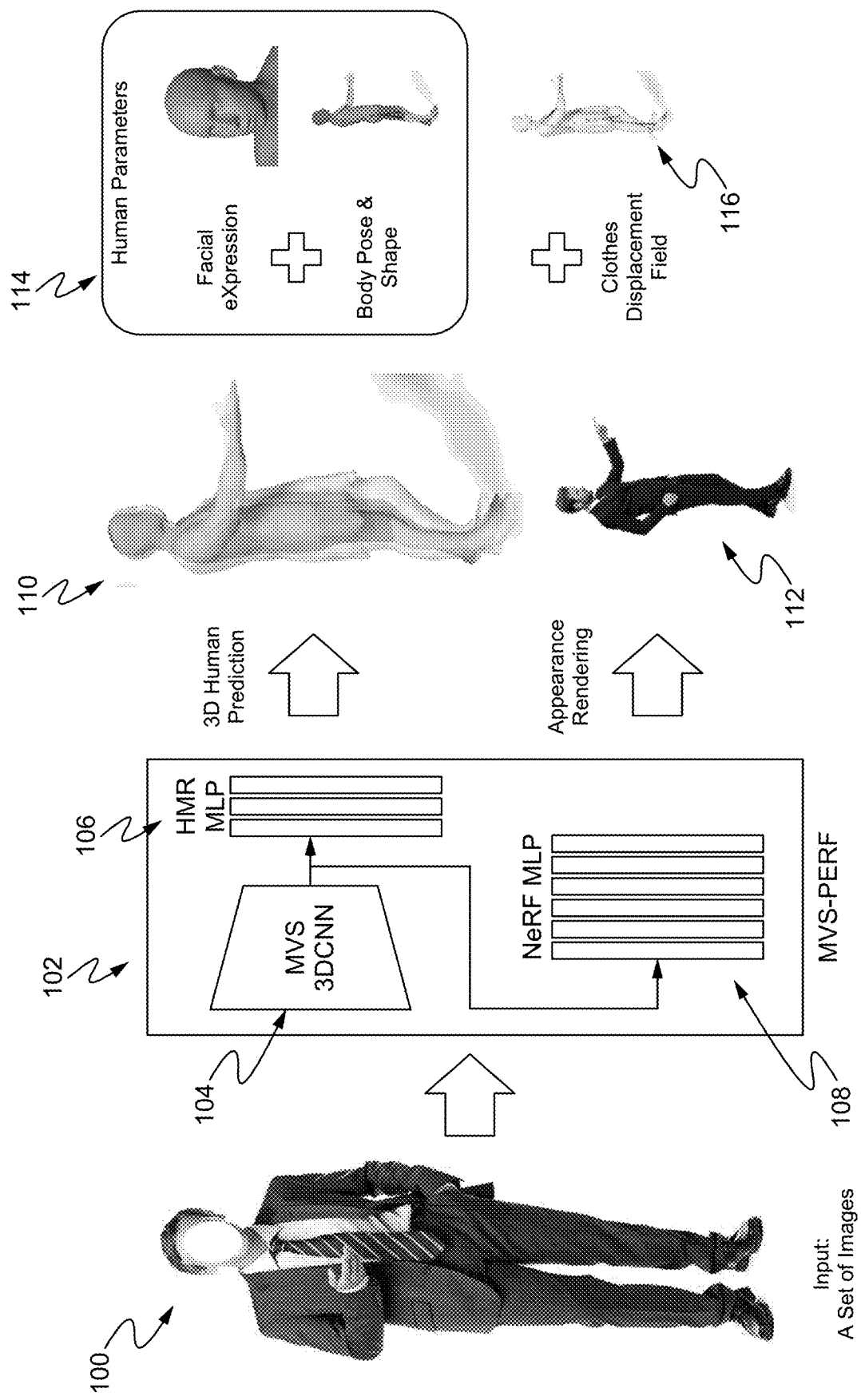
FIG. 1 illustrates a flowchart of neural human prediction according to some embodiments.

FIG. 1 illustrates a flowchart of neural human prediction according to some embodiments. In the step 100, an input set I of images, a single image or multiview images, e.g., a set of pictures taken around a subject, are acquired as input. The input I is denoted as a 4D tensor of size N×w×h×c, N for number of views, w, h, c for image width, height and channel, respectively. The cameras are already calibrated, so all of the camera information (e.g., camera parameters) is known. An image preprocess extracts the subject's bounding box and foreground mask using existing approaches such as Detectron2 and image Grab-Cut. Images are cropped by the bounding box and zoomed to size of w×h with the same aspect ratio. Image borders are filled in black.

The neural network (MVS-PERF) 102 is comprised of three components: a multiview stereo 3D convolutional neural network (MVS-3DCNN) 104, which encodes an input set of images to features; a human mesh recovery multilayer perceptron (HMR MLP) 106, which regresses the features to human parameters; and a neural radiance field multilayer perceptron (NeRF MLP) 108, which fine-tunes the MVS-3DCNN and decodes a query 3D ray (3D location and direction) to an RGB color and a clothes-to-body displacement.

In the step 104, a deep 2D CNN extracts image features from each view. Each convolutional layer is followed by a batch-normalization (BN) layer and a rectified linear unit (ReLU) except for the last layer. Two downsampling layers are also placed. The output of the 2D CNN are a feature map of size w/4×h/4×32.

And then a view is first chosen as a reference view and its view frustum is set according to perspective projection and near far planes to cover the entire working space of the subject. From near to far, the frustrum is sampled by d depth planes which are parallel to both near and far planes. All the feature maps are transformed and blended to each depth plane.

For any view i, i=1, 2, ..., N, the 3×3 homography image warping matrix to the reference view (index as 1) is given by $$H_i(z) = K_i \left( R_i R_1^T + \frac{-R_1^T t_1 + R_i^T t_i}{z} n^T \right) K_i^{-1}$$

Where K, [R, t] stand for the camera intrinsic and extrinsic parameters, z is the distance from a depth plane to the camera center of the reference view, and n is the normal direction of the depth plane.

After all the images are warped to a depth plane, a cost at the coordinate (u, v, z) is determined by the variance of all features $\Sigma_{i=1}^{N}(V_i - \overline{V}_i)^2 / N \cdot \overline{V}_i$ is the average feature value among all views. The size of the cost volume is d×w/4×h/4.

In the step 106, the human mesh recovery multilayer perceptron (HMR MLP) includes three layers of linear regression separated by flatten and dropout layers. It regresses the feature volume from MVS 3DCNN to the human body parameter $\theta_{reg}$ 114.

Human body parameter $\theta_{reg}$ is able to manipulate a human parametric model, e.g., SMPL-X, to a 3D naked body mesh 202. Typically, a SMPL-X representation $\theta_{reg}$ of contains the skeletal poses (the 3D rotation angles of each joint), the body blendshape parameter to control the body shape, e.g., height, weight, and others, and the facial blendshape parameter to control the expression of the face. It builds a T-pose mesh using blendshape parameters and deforms it to a posed mesh by the skeletal pose of a linear skinning model.

In the step 108, on the other hand, the cost volume is sent to a differentiable rendering MLP, such as neural radiance field (NeRF). The NeRF MLP is formularized as a functional M that maps a query ray, represented by a 3D position x and a direction φ, to a 4-channel color RGBσ, c(x, φ)=M(x, φ, f; Γ). f is the feature map from the cost volume of the frustum MVS 3DCNN 104 to the NeRF volume, and Γ is the weight of the NeRF MLP network. σ denotes the occupancy density of a probability if the 3D point is inside a mesh. The occupancy density field $\sigma_b$ of a naked body can be directly obtained by converting the mesh 202 (FIG. 2) in the frustum 104. Then the density field σ of clothed body can be represented as a function of a 3D displacement vector field D and the feature map f. σ(D, f). The 3D displacement vector field D 116 represents how a point on the clothed body surface 204 is related to a point on the naked body surface. When NeRF MLP is trained, the displacement vector field D is also optimized.

Figure 2:
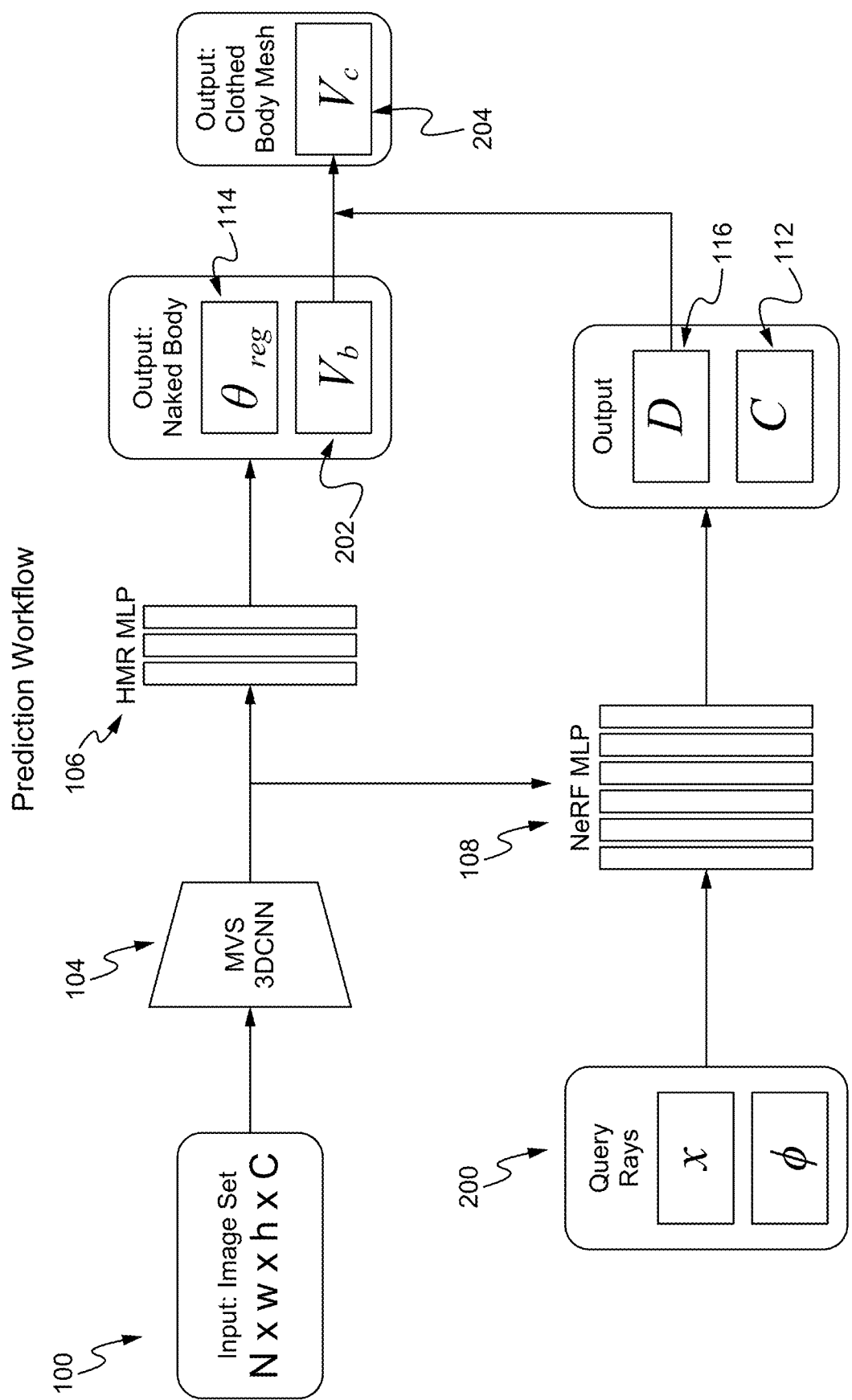
FIG. 2 illustrates the workflow of a forward prediction represented by the tensor notations, in which the weight of all the networks MVS 3DCNN, HMR MLP and NeRF MLP are known, according to some embodiments.

FIG. 2 illustrates the workflow of a forward prediction represented by the tensor notations, in which the weight of all the networks MVS 3DCNN, HMR MLP and NeRF MLP are trained and fixed, according to some embodiments. By querying for all the rays 200 of pixels from a perspective projected image, the appearance image 112 is rendered. In some embodiments, 3D human prediction 110 is implemented. By querying for sampled points near the human body, the displacement field D 116 is obtained. For a human performance capture task, in which the clothed output mesh has the same topology as the template, the naked body mesh $V_b$ 202 can be deformed to a clothed body mesh $V_c$ 204 by adding an interpolated displacement vector to each vertex.

Figure 3:
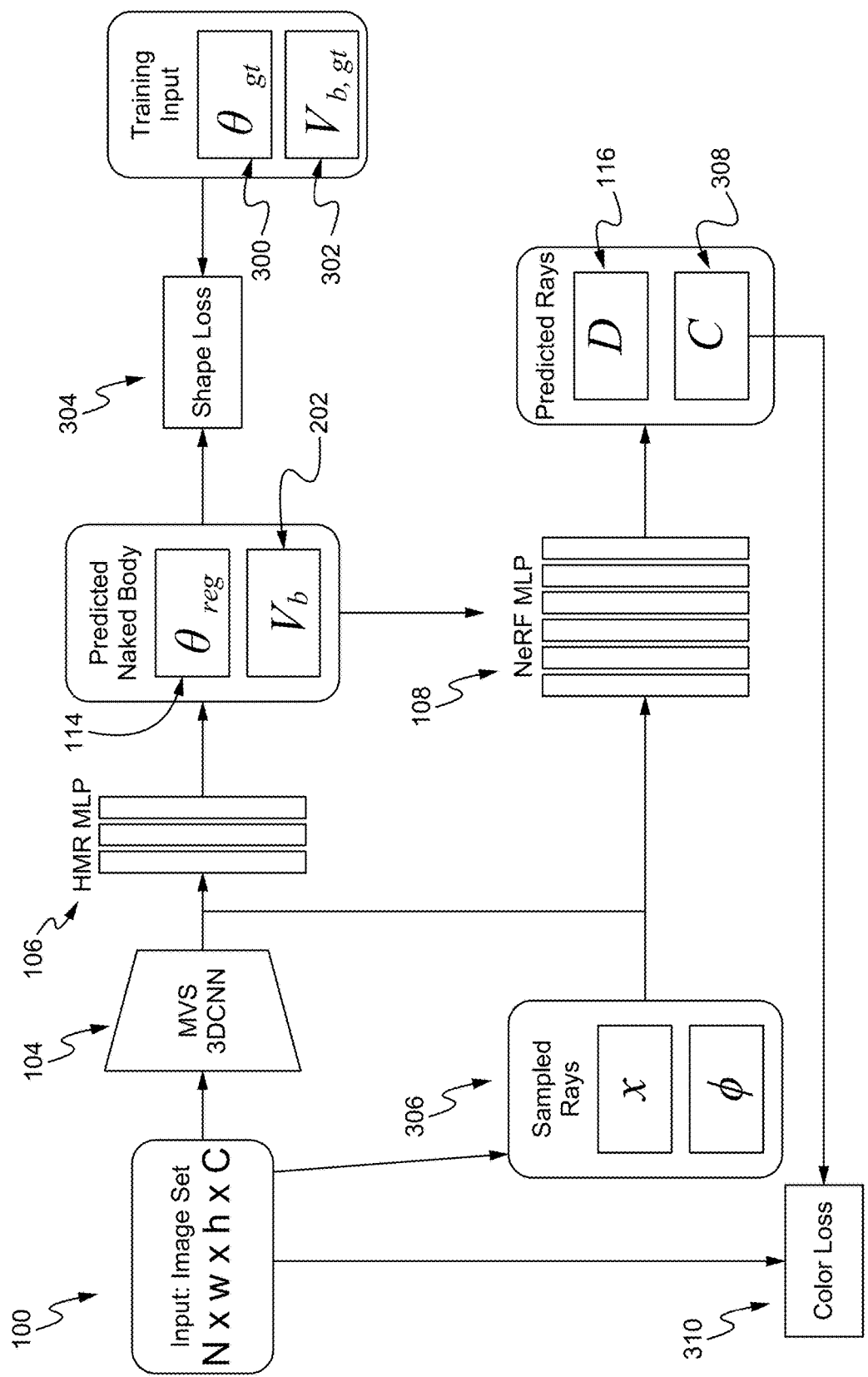
FIG. 3 illustrates the workflow of training the network using supervision according to some embodiments.

FIG. 3 illustrates the workflow of training the network using supervision according to some embodiments. A supervised training dataset, e.g., Human3.6M, contains not only image input I 100 but also ground truth human parameters $\theta_{gt}$ 300 and naked body mesh $V_{b,gt}$ 302, which are usually acquired by sensors or existing approaches. In this case, a shape loss 304 is directly obtained by summing the difference of the predicted naked body and the ground truth.

$$\text{Shapeloss}=w_\theta\|\theta_{reg}-\theta_{gt}\|^2+w_v\Sigma\|V_b-V_{b,gt}\|^2+w_j\Sigma\|J_b-J_{b,gt}\|^2+w_{j,2D}\Sigma\|\Pi(J_b)-\Pi(J_{b,gt})\|^2$$

where J are the joints of the naked body, Π denotes the perspective projection of a 3D point for each camera view. To train the network effectively, in each training step, all the views take turn being chosen as the reference view for MVS 3DCNN.

Meanwhile, rays 306 are sampled from the input image set 100, typically using an uneven sampling strategy proportional to the image saliency. More rays are sampled in high salient regions and fewer rays are from plain or background regions. These rays are sent together with the feature map from MVS 3DCNN 104 into the NeRF MLP 108, which renders the samples appearance RGBσ colors 308. A color loss 310 is computed by summing all the difference of sampled color in the input image and the rendered colors 308.

A parallelized stochastic optimization algorithm, e.g., Adam, is applied to train the weight of all networks MVS 3DCNN, HMR MLP, NeRF MLP by minimizing both shape and color losses.

Figure 4:
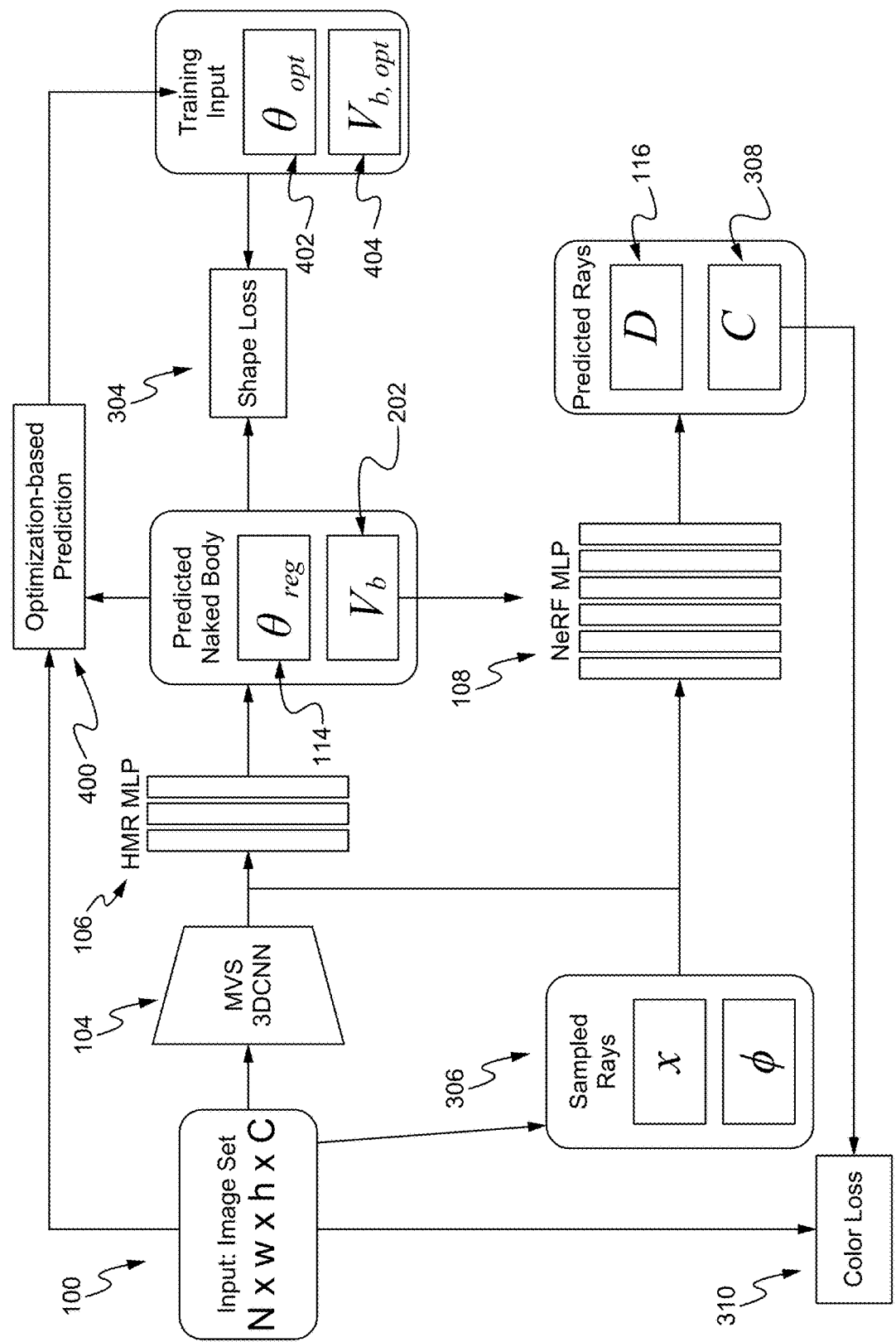
FIG. 4 illustrates the workflow of training the network in a self-improving strategy according to some embodiments.

FIG. 4 illustrates the workflow of training the network in a self-improving strategy according to some embodiments. In this case, the training dataset only provides human images without any annotation or human ground truth parameters. For each image in the input set 100, an optimization-based prediction 400, e.g., SMPLifyX algorithm, is applied by taking the regressed parameter $\theta_{reg}$ 114 as an initial guess. The optimization-based prediction detects human 2D key points on each image first and applies a nonlinear optimization to fit the 3D human.

Mesh $V_{b,opt}$ 404 (parameterized by $\theta_{opt}$ 402) to these 2D key points.

$$\theta_{opt}=\arg\min \Sigma\|\Pi(V_{b,opt})-K\|^2$$

Where K denotes the detected 2D location of a key point, and the sum takes over all the corresponding key points and all the views.

Although the nonlinear least square optimization is numerically slow, and the fitting accuracy relies on the initial guess $\theta_{reg}$, it is reliable. After sufficient iterations of fitting, $\theta_{opt}$ will be close to the ground truth. Therefore, a self-improving training workflow can efficiently improve $\theta_{opt}$ towards the ground truth as summarized in the following:

Self-improving training workflow:
Do
  Compute $\theta_{reg}$ from MVS-3DCNN and HMR MLP from the input I
  Compute $\theta_{opt}$ from SMPLifyX taking $\theta_{reg}$ as initial guess and I as input
  Sample Rays from I and compute sampled color c from NeRF MLP
  Compute the ShapeLoss and ColorLosss
  Update network weight of MVS 3DCNN, HMR MLP and NeRF MLP by minimizing ShapeLoss and ColorLoss
  Repeat for all training data and until weight converges.

Figure 5:
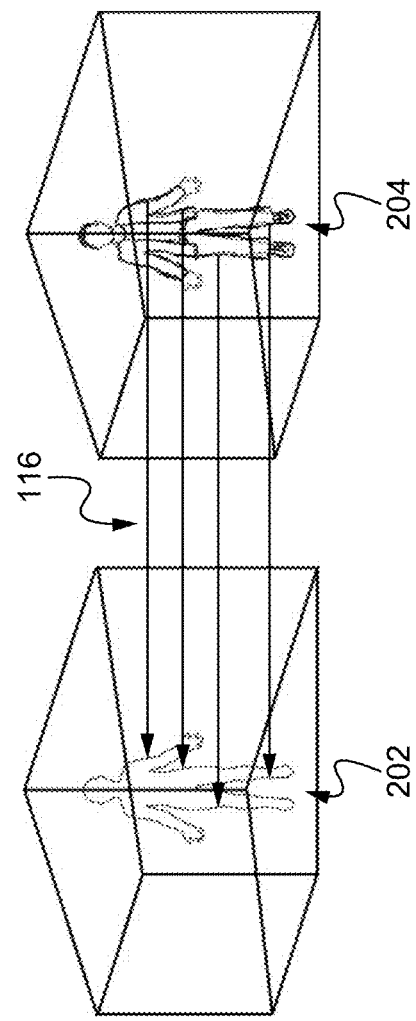
FIG. 5 illustrates the alignment of the MVS 3DCNN of each view to the NeRF MLP according to some embodiments.
Figure 5:
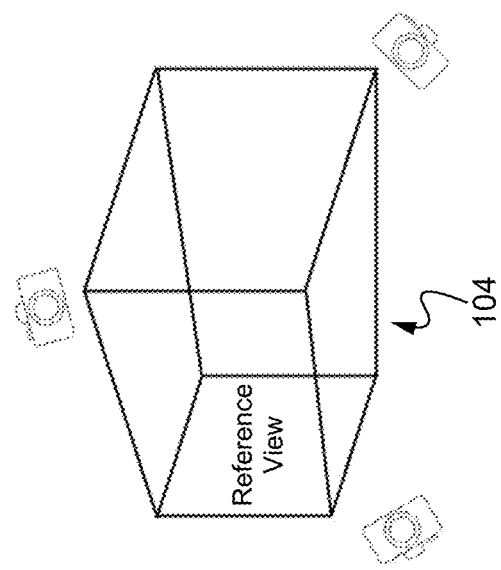

FIG. 5 illustrates the alignment of the MVS 3DCNN of each view to the NeRF MLP according to some embodiments.

In operation, the neural human prediction is able to be directly applied in both commercial and/or personal markerless performance capture applications, for example, a markerless motion capture in game studio, or human 3D surface reconstruction RGB camera setup. Other applications of embodiments of the multiview neural human prediction are able to be as a real-time backbone technique able to be combined with any extension, for example, combining the input of depth sensing, 3D modeling, or using the output for creating novel animation. Multiview neural human prediction is also able to be applied in gaming, VR/AR and any real-time human interactive applications. Depending on the hardware used (e.g., the speed of the GPU processors and size of GPU memories), the multiview neural human prediction is in real-time when processing sparser views for prediction, and for more views (e.g., 20), near real-time processing and prediction is able to be implemented.

The methods described herein are able to be implemented on any computing device. Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Some Embodiments of Multiview Neural Human Prediction Using Implicit Differentiable Renderer for Facial Expression, Body Pose Shape and Clothes Performance Capture 1. A method programmed in a non-transitory of a device comprising:
   acquiring a set of images as input; and
   processing, with a neural network, the set of images, wherein processing includes:
     encoding the set of images to one or more features;
     regressing the features to human parameters;
     fine-tuning the neural network; and
     decoding a query 3D ray to an RGB color and a clothes-to-body displacement, wherein the RGB color is based on the set of images.

2. The method of clause 1 wherein the set of images comprises a 4D tensor of size N×w×h×c, where N is a number of views, w is width of an image, h is height of the image, and c is a channel of the image.

3. The method of clause 1 wherein the neural network chooses a frontal view as a reference view from the set of images and extracts a feature volume.

4. The method of clause 3 wherein the neural network regresses all the feature volumes to the human pose, shape, facial expression parameters.

5. The method of clause 4 wherein the neural network generates a human naked body mesh according to the parameters.

6. The method of clause 5 wherein the naked body mesh is converted into an occupancy field in a bounding box.

7. The method of clause 6 wherein the neural network generates the RGB color and a 3D displacement vector pointing to the surface of the naked body for any 3D point near the body mesh, associated with ray directions from each center of view.

8. The method of clause 7 wherein the appearance of the clothed human body is rendered as an RGB image by querying all rays shooting from all pixels of a camera view, and the clothed body mesh is obtained by deforming the naked body using the 3D displacement vectors from sampled points.

9. The method of clause 1 wherein the neural network is implemented in a supervision mode or a self-supervision mode.

10. An apparatus comprising:
a non-transitory memory configured for storing an application, the application configured for:
acquiring a set of images as input; and
processing, with a neural network, the set of images, wherein processing includes:
encoding the set of images to one or more features;
regressing the features to human parameters;
fine-tuning the neural network; and
decoding a query 3D ray to an RGB color and a clothes-to-body displacement, wherein the RGB color is based on the set of images; and
a processor configured for processing the application.

11. The apparatus of clause 10 wherein the set of images comprises a 4D tensor of size N×w×h×c, where N is a number of views, w is width of an image, h is height of the image, and c is a channel of the image.

12. The apparatus of clause 10 wherein the neural network chooses a frontal view as a reference view from the set of images and extracts a feature volume.

13. The apparatus of clause 12 wherein the neural network regresses all the feature volumes to the human pose, shape, facial expression parameters.

14. The apparatus of clause 13 wherein the neural network generates a human naked body mesh according to the parameters.

15. The apparatus of clause 14 wherein the naked body mesh is converted into an occupancy field in a bounding box.

16. The apparatus of clause 15 wherein the neural network generates the RGB color and a 3D displacement vector pointing to the surface of the naked body for any 3D point near the body mesh, associated with ray directions from each center of view.

17. The apparatus of clause 16 wherein the appearance of the clothed human body is rendered as an RGB image by querying all rays shooting from all pixels of a camera view, and the clothed body mesh is obtained by deforming the naked body using the 3D displacement vectors from sampled points.

18. The apparatus of clause 10 wherein the neural network is implemented in a supervision mode or a self-supervision mode.

19. An apparatus comprising:
a non-transitory memory configured for storing an application, the application comprising:
a multiview stereo 3D convolutional neural network (MVS-3DCNN) configured for encoding an input image set to features;
a human mesh recovery multilayer perceptron (HMR MLP) configured for regressing the features to human parameters; and
a neural radiance field multilayer perceptron (NeRF MLP) configured for fine-tuning the MVS-3DCNN and decodes a query 3D ray (3D location and direction) to an RGB color and a clothes-to-body displacement; and
a processor configured for processing the application.

20. The apparatus of clause 19 wherein the set of images comprises a 4D tensor of size N×w×h×c, where N is a number of views, w is width of an image, h is height of the image, and c is a channel of the image.

21. The apparatus of clause 20 wherein the MVS-3DCNN chooses a frontal view as a reference view from the set of images and extracts a feature volume.

22. The apparatus of clause 21 wherein the HMR MLP regresses all the feature volumes to the human pose, shape, facial expression parameters.

23. The apparatus of clause 22 further comprising a model configured for generating a human naked body mesh according to the parameters.

24. The apparatus of clause 23 wherein the naked body mesh is converted into an occupancy field in a bounding box.

25. The apparatus of clause 24 wherein the NeRF MLP generates the RGB color and a 3D displacement vector pointing to the surface of the naked body for any 3D point near the body mesh, associated with ray directions from each center of view.

26. The apparatus of clause 25 wherein the appearance of the clothed human body is rendered as an RGB image by querying all rays shooting from all pixels of a camera view, and the clothed body mesh is obtained by deforming the naked body using the 3D displacement vectors from sampled points.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory of a device comprising:
acquiring a set of images as input; and
processing, with a neural network, the set of images, wherein processing includes:
encoding the set of images to one or more features;
regressing the features to human parameters;
fine-tuning the neural network; and
decoding a query 3D ray to an RGB color and a clothes-to-body displacement, wherein the RGB color is based on the set of images.

2. The method of claim 1 wherein the set of images comprises a 4D tensor of size N×w×h×c, where N is a number of views, w is width of an image, h is height of the image, and c is a channel of the image.

3. The method of claim 1 wherein the neural network chooses a frontal view as a reference view from the set of images and extracts a feature volume.

4. The method of claim 3 wherein the neural network regresses all the feature volumes to the human pose, shape, facial expression parameters.

5. The method of claim 4 wherein the neural network generates a human naked body mesh according to the parameters.

6. The method of claim 5 wherein the naked body mesh is converted into an occupancy field in a bounding box.

7. The method of claim 6 wherein the neural network generates the RGB color and a 3D displacement vector pointing to the surface of the naked body for any 3D point near the body mesh, associated with ray directions from each center of view.

8. The method of claim 7 wherein the appearance of the clothed human body is rendered as an RGB image by querying all rays shooting from all pixels of a camera view, and the clothed body mesh is obtained by deforming the naked body using the 3D displacement vectors from sampled points.

9. The method of claim 1 wherein the neural network is implemented in a supervision mode or a self-supervision mode.

10. An apparatus comprising:
a non-transitory memory configured for storing an application, the application configured for:
acquiring a set of images as input; and
processing, with a neural network, the set of images, wherein processing includes:
encoding the set of images to one or more features;
regressing the features to human parameters;
fine-tuning the neural network; and
decoding a query 3D ray to an RGB color and a clothes-to-body displacement, wherein the RGB color is based on the set of images; and
a processor configured for processing the application.

11. The apparatus of claim 10 wherein the set of images comprises a 4D tensor of size N×w×h×c, where N is a number of views, w is width of an image, h is height of the image, and c is a channel of the image.

12. The apparatus of claim 10 wherein the neural network chooses a frontal view as a reference view from the set of images and extracts a feature volume.

13. The apparatus of claim 12 wherein the neural network regresses all the feature volumes to the human pose, shape, facial expression parameters.

14. The apparatus of claim 13 wherein the neural network generates a human naked body mesh according to the parameters.

15. The apparatus of claim 14 wherein the naked body mesh is converted into an occupancy field in a bounding box.

16. The apparatus of claim 15 wherein the neural network generates the RGB color and a 3D displacement vector pointing to the surface of the naked body for any 3D point near the body mesh, associated with ray directions from each center of view.

17. The apparatus of claim 16 wherein the appearance of the clothed human body is rendered as an RGB image by querying all rays shooting from all pixels of a camera view, and the clothed body mesh is obtained by deforming the naked body using the 3D displacement vectors from sampled points.

18. The apparatus of claim 10 wherein the neural network is implemented in a supervision mode or a self-supervision mode.

19. An apparatus comprising:
a non-transitory memory configured for storing an application, the application comprising:
a multiview stereo 3D convolutional neural network (MVS-3DCNN) configured for encoding an input image set to features;
a human mesh recovery multilayer perceptron (HMR MLP) configured for regressing the features to human parameters; and
a neural radiance field multilayer perceptron (NeRF MLP) configured for fine-tuning the MVS-3DCNN and decodes a query 3D ray (3D location and direction) to an RGB color and a clothes-to-body displacement; and
a processor configured for processing the application.

20. The apparatus of claim 19 wherein the set of images comprises a 4D tensor of size N×w×h×c, where N is a number of views, w is width of an image, h is height of the image, and c is a channel of the image.

21. The apparatus of claim 20 wherein the MVS-3DCNN chooses a frontal view as a reference view from the set of images and extracts a feature volume.

22. The apparatus of claim 21 wherein the HMR MLP regresses all the feature volumes to the human pose, shape, facial expression parameters.

23. The apparatus of claim 22 further comprising a model configured for generating a human naked body mesh according to the parameters.

24. The apparatus of claim 23 wherein the naked body mesh is converted into an occupancy field in a bounding box.

25. The apparatus of claim 24 wherein the NeRF MLP generates the RGB color and a 3D displacement vector pointing to the surface of the naked body for any 3D point near the body mesh, associated with ray directions from each center of view.

26. The apparatus of claim 25 wherein the appearance of the clothed human body is rendered as an RGB image by querying all rays shooting from all pixels of a camera view, and the clothed body mesh is obtained by deforming the naked body using the 3D displacement vectors from sampled points.

* * * * *